Nov. 29, 1927.
L. M. BUSH
1,651,325
JOINT FASTENER
Filed April 26, 1927
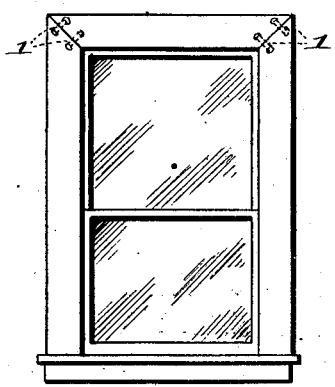
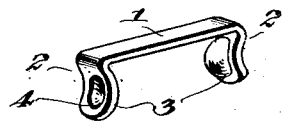
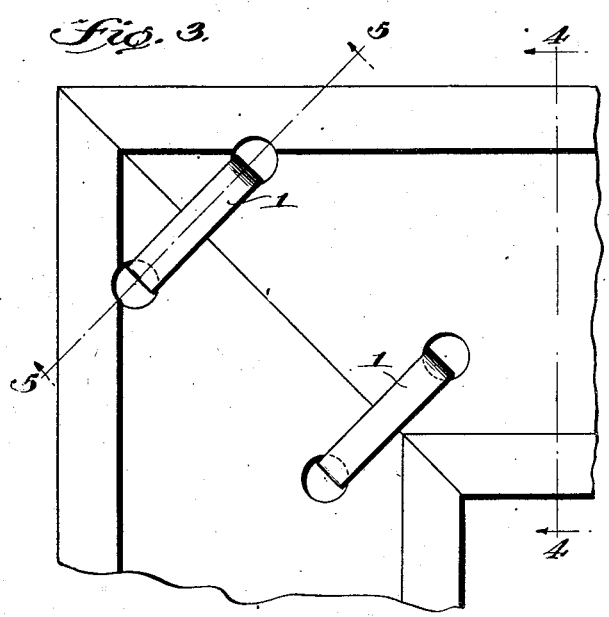
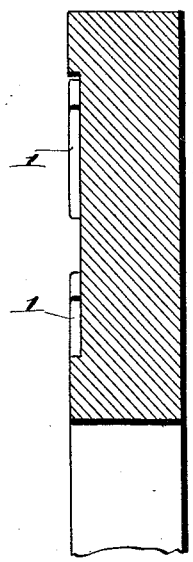
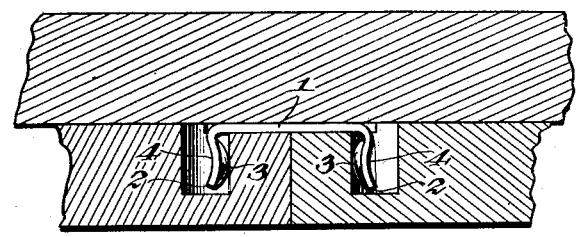
INVENTOR
L. M. Bush,
BY
ATTORNEYS Patented Nov. 29, 1927.

1,651,325

UNITED STATES PATENT OFFICE.

LUTHER M. BUSH, OF ROYERSFORD, PENNSYLVANIA.

JOINT FASTENER.

Application filed April 26, 1927. Serial No. 186,720.

This invention relates to fasteners intended especially for joining and holding mitered edges of woodwork together, particularly those occurring in window, door and picture frames. The device is not limited to such use, however, but may be applied to the holding together of any two or more edges, whether they be of wood or other material, or whether mitered, straight or curved.

Referring now to the drawings,

Figure 1 is a perspective view of the device from the left side,

Figure 2 is a side elevation of a window, showing four of the devices in use on the frame, Fig. 3 is an enlarged detail of one of the mitered edges shown in Fig. 2 and illustrates two of the fasteners in use, Fig. 4 is a cross section of the frame shown in Fig. 3, taken on the line 4—4 of Fig. 3 and looking toward the left, Fig. 5 is a section of the frame and of a fastener shown in Fig. 3, taken on the line 5—5 of Fig. 3 and looking toward the corner thereof.

Describing now again Fig. 1, numeral 1 denotes a strap of strong and elastic material preferably steel, having a pair of downturned ends 2, substantially at right angles to the main portion 1.

Near the bottom of the ends 2, inward oval protuberances 3—3 are stamped into the metal, one on each edge. The stamping of these protuberances leaves a corresponding depression in the outer side of the metal strap, and these depressions, of which only one is visible in the drawing of Fig. 1, are indicated at 4—4. The oval protuberances are preferably vertical when the fastener is in the position shown in Figs. 1 and 5.

In Fig. 5 they may be seen to better advantage. Like reference characters indicate like parts in Figs. 1 and 5 and also all of the other figures.

The use of the fasteners may be readily understood by reference to Figs. 1, 3, 4 and 5. When it is desired to join two mitered edges, two holes are bored in the surface adjacent to each edge at such a distance from the edge that the downturned edges of the fastener will engage the adjoining edges of each hole with a driving fit as shown in Fig. 5. Such a fit will spread the downturned ends 2 more or less and the elasticity or resiliency of the metal will provide sufficient "bite" to hold the fastener in place. The actual contact between the wood and metal will take place on the inner protuberances 3.

It will be observed that in driving the fastener home the oval shaped protuberances will ride over the adjacent walls in the bored openings and thus guide the extremities 2 in place. Moreover with the fastener driven fully home these protuberances will cam against the walls of the openings and thereby lock the fastening in place.

The holes bored in the wood need be only deep enough to accommodate the ends 2.

As many fasteners may be used to hold one edge together, as may be necessary or desirable.

It will be understood that modifications of this device will readily occur to those skilled in the art, and that all such modifications I claim as my own if they fairly fall within the scope of the appended claims.

I claim:—

1. A fastener comprising a strap of substantially stiff material having ends turned for a substantial distance at right angles to the main portion of the strap, and a protuberance on the inner face of each right angular extending end and engageable with the objects to be fastened together to retain the fastening in clamped engagement with such objects.

2. As an article of manufacture a clamp for clamping two objects in juxtaposition including a ribbon-like resilient U-shaped member to straddle the objects, and a curved protuberance formed upon the inner face of each of the parallel legs of the U-shaped member to cam against the objects and thereby lock the fastener in place.

3. As an article of manufacture a U-shaped clamp to embrace two objects arranged side by side and formed from a length of relatively flat material, and a longitudinally curved protuberance formed upon the inner face of each of the parallel legs of the U-shaped clamp to facilitate engagement of the legs with the objects and camming against the latter to lock the fastener in place upon the application of pressure to the latter to force it home.

4. As an article of manufacture a U-shaped clamp formed from a longitudinal strip of relatively flat material having its parallel legs longitudinally curved in opposite directions and depressed from their outer faces to provide lateral protuberances upon their inner faces to bind against objects with which the clamp is engaged.

LUTHER M. BUSH.